United States Patent
Griswold et al.

(10) Patent No.: US 9,758,701 B2
(45) Date of Patent: *Sep. 12, 2017

(54) RELEASE MODIFIER COMPOSITION

(71) Applicant: Momentive Performance Materials Inc., Waterford, NY (US)

(72) Inventors: Roy Melvin Griswold, Ballston Spa, NY (US); Melania Lapinski, Mechanicville, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,680

(22) Filed: Oct. 5, 2016

(65) Prior Publication Data

US 2017/0022395 A1 Jan. 26, 2017

Related U.S. Application Data

(62) Division of application No. 14/287,606, filed on May 27, 2014, now Pat. No. 9,487,677.

(51) Int. Cl.
| | |
|---|---|
| *C09D 183/04* | (2006.01) |
| *C09J 7/02* | (2006.01) |
| *C09D 7/12* | (2006.01) |
| *C09D 183/14* | (2006.01) |
| *C08L 83/04* | (2006.01) |
| *C09D 5/00* | (2006.01) |
| *C08G 77/12* | (2006.01) |
| *C08G 77/20* | (2006.01) |

(52) U.S. Cl.
CPC ............ *C09J 7/0228* (2013.01); *C08L 83/04* (2013.01); *C09D 5/00* (2013.01); *C09D 7/125* (2013.01); *C09D 7/1233* (2013.01); *C09D 183/04* (2013.01); *C09D 183/14* (2013.01); *C08G 77/12* (2013.01); *C08G 77/20* (2013.01); *C09J 2483/005* (2013.01); *Y10T 428/2839* (2015.01)

(58) Field of Classification Search
None
See application file for complete search history.

(56) References Cited

U.S. PATENT DOCUMENTS

| | | | |
|---|---|---|---|
| 4,123,604 A * | 10/1978 | Sandford, Jr. .......... | C08L 83/04 428/447 |
| 4,526,953 A | 7/1985 | Dallavia, Jr. | |
| 4,611,042 A | 9/1986 | Rivers-Farrell et al. | |
| 5,468,816 A | 11/1995 | Hurford et al. | |
| 5,468,826 A | 11/1995 | Gentle et al. | |
| 5,708,075 A | 1/1998 | Chung et al. | |
| 5,741,439 A | 4/1998 | Armstrong et al. | |
| 6,008,310 A | 12/1999 | Itoh et al. | |
| 6,124,419 A | 9/2000 | Armstrong et al. | |
| 7,846,550 B2 | 12/2010 | Ooms et al. | |
| 9,487,677 B2 * | 11/2016 | Griswold ............. | C09D 183/04 |
| 2007/0087207 A1 | 4/2007 | Irifune | |
| 2007/0106016 A1 * | 5/2007 | Zhu ........................ | A43B 13/04 524/588 |
| 2007/0129507 A1 | 6/2007 | Irifune | |
| 2008/0311333 A1 | 12/2008 | Yoon et al. | |
| 2010/0297903 A1 * | 11/2010 | Thiria .................. | B60R 21/235 442/65 |
| 2011/0112268 A1 | 5/2011 | Katayama | |
| 2011/0160376 A1 * | 6/2011 | Hori ...................... | C08G 77/44 524/500 |
| 2011/0189422 A1 * | 8/2011 | Frances .................. | B29C 59/14 428/41.5 |
| 2012/0065343 A1 * | 3/2012 | Bahadur ................ | C08L 83/04 525/478 |
| 2015/0133594 A1 * | 5/2015 | Ihara ..................... | C08G 77/44 524/500 |
| 2016/0325705 A1 * | 11/2016 | Zhou ...................... | D06N 3/12 |

FOREIGN PATENT DOCUMENTS

| | | |
|---|---|---|
| EP | 0601938 B1 | 4/1998 |
| EP | 0860487 A2 | 8/1998 |
| WO | 2008027280 A2 | 3/2008 |
| WO | WO 2015/100571 A1 * | 7/2015 |

OTHER PUBLICATIONS

International Search Report and Written Opinion for PCT/US2015/030773, dated Jul. 17, 2015, 10 pages.
Abstract for CN102838749, dated Dec. 26, 2012.
Huang et al., Hydrogen-containing silicone oil used as e.g. silicon rubber crosslinking agent, is obtained by connecting polysiloxane main chain of hydrogen-containing silicone oil with polyhedron oligomerization silsesquioxane through chemical bond.

* cited by examiner

*Primary Examiner* — Marc Zimmer
(74) *Attorney, Agent, or Firm* — Hoffman Warnick LLC

(57) ABSTRACT

There is described a release composition including a polyorganosiloxane polymer and a release modifier. The release modifier includes comprising an alkenyl silsesquioxane an organo functional siloxane of the formula $MD_xM$, wherein M represents $R_3SiO_{1/2}$, D represents $R_2SiO_{2/2}$, wherein R is alkyl or alkenyl of 1 to 40 carbon atoms, or hydrogen wherein the organo functional siloxane has a viscosity of from about 5 centipoises to about 80 centipoises and x is from about 5 to about 80, and an optionally a reactive diluent. The release composition includes at least one siloxane cross-linking agent, an inhibitor; and a hydrosilation catalyst.

18 Claims, 2 Drawing Sheets

RELEASE MODIFIER COMPOSITION

CROSS-REFERENCE TO RELATED APPLICATIONS

This application is a divisional of co-pending U.S. patent application Ser. No. 14/287,606 filed on May 27, 2014.

BACKGROUND

The present disclosure relates to curable silicone release coating compositions for laminate release applications.

Release coatings which are non-adherent to adhesives are known in the coatings art. For example paper release coatings are used to release adhesives, e.g pressure sensitive adhesives, from labels, decorative laminates, transfer tapes etc.

Polydimethylsiloxanes provide, when cross-linked, release coatings. This means that an adhesive-laminated face stock may be detached with very little force required which is desired for many release applications.

However, in various applications a higher release force is required for detachment. For example in laser printer application or at high speed converting machines, pre-dispensing has to be prevented by such a higher release level. Another example in which a higher release level is needed, is the usage in differential release liners wherein one side of the substrate is coated with a premium release silicone (low release forces) while the other side is coated with a tight (high release forces) release silicone layer.

Dependent on the application, a wide range of release force levels are required. The additives, which when mixed into a base polymer, modify the release characteristics in a controlled manner. These additives are referred to as controlled release additives (CRAs).

These control release additives can include a vinyl functional silicone resin, a siloxane fluid and optionally a reactive diluent such as an α-olefin or vinyl-ether to control composition viscosity below 10,000 centipoises. Examples of control release additives are disclosed in US 2011/0160376, US 2008/0311333, US 2007/0129507, US 2007/0087207, U.S. Pat. No. 7,846,550, U.S. Pat. No. 6,008,310, EP0601938B1, U.S. Pat. No. 6,124,419, U.S. Pat. No. 5,741,439, U.S. Pat. No. 5,708,075, U.S. Pat. No. 5,468,826, U.S. Pat. No. 5,468,816 and U.S. Pat. No. 4,611,042.

The release modifier compositions cited above can be produced through condensation of MQ resin with siloxane polymers. The release modifier compositions can have varying polymer or resin molecular weights and/or alkenyl content. The release compositions can incorporate "T" units into the MQ resin or the release compositions can included mixtures of lower/higher alkenyl or alkenyl/hydrogen MQ resins. The release compositions can cap hydroxyl MQ resins with various capping agents to impart different organo-functionalities such as alkenyl or hydrogen.

Still there remains a need for release modifier compositions that offer efficient release modification, reduced α-olefin or vinyl-ether content when used in the formulated release coating composition and no limitations as to type of adhesive used in the laminate.

SUMMARY

Disclosed herein is a release composition including a polyorganosiloxane polymer and a release modifier. The release modifier includes an alkenyl silsesquioxane, an organo functional siloxane of the formula $MD_xM$, wherein M represents $R_3SiO_{1/2}$, D represents $R_2SiO_{2/2}$, wherein R is alkyl or alkenyl of 1 to 40 carbon atoms, or hydrogen wherein the organo functional siloxane has a viscosity of from about 5 centipoises to about 80 centipoises and x is from about 5 to about 80, and an optionally a reactive diluent. The release composition includes at least one siloxane cross-linking agent, an inhibitor; and a hydrosilation catalyst.

There is provided a release modifier including an alkenyl silsesquioxane, and an organo functional siloxane of the formula $MD_xM$, wherein M represents $R_3SiO_{1/2}$, D represents $R_2SiO_{2/2}$, wherein R is alkyl or alkenyl of 1 to 40 carbon atoms, or hydrogen. wherein the organo functional siloxane has a viscosity of from about 5 centipoises to about 80 centipoises and x is from about 5 to about 80.

Disclosed herein is a release composition including a polyorganosiloxane polymer represented by:

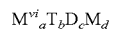

$$M^{vi}_a T_b D_c M_d$$

where $M^{vi}=R_{3-p}R^1_p SiO_{1/2}$, where R is selected from the group consisting of one to forty carbon monovalent hydrocarbon radicals, $R^1$ is selected from the group consisting of two to forty carbon atom olefinic monovalent hydrocarbon radicals, p ranges from 1 to 3; $T=R^2 SiO_{3/2}$ where $R^2$ is selected from the group consisting of R and $R^1$; $D=R^3 R^4 SiO_{2/2}$ where $R^3$ and $R^4$ are each independently selected from the group consisting of R and $R^1$; and $M=R_3 SiO_{1/2}$ where each R is independently selected, and the subscripts a and b have values ranging from about 2 to about 5 and c is an integer ranging from about 50 to about 1,000 and d has a value ranging from 0 to 0.5. The release composition includes a release modifier including an alkenyl silsesquioxane, an organo functional siloxane of the formula $MD_xM$, wherein M represents $R_3SiO_{1/2}$, D represents $R_2SiO_{2/2}$, wherein R is alkyl or alkenyl of 1 to 40 carbon atoms, or hydrogen wherein the organo functional siloxane has a viscosity of from about 5 centipoises to about 80 centipoises and x is from about 5 to about 80, and a reactive diluent. The release composition includes at least one siloxane cross-linking agent; an inhibitor, and a hydrosilation catalyst.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
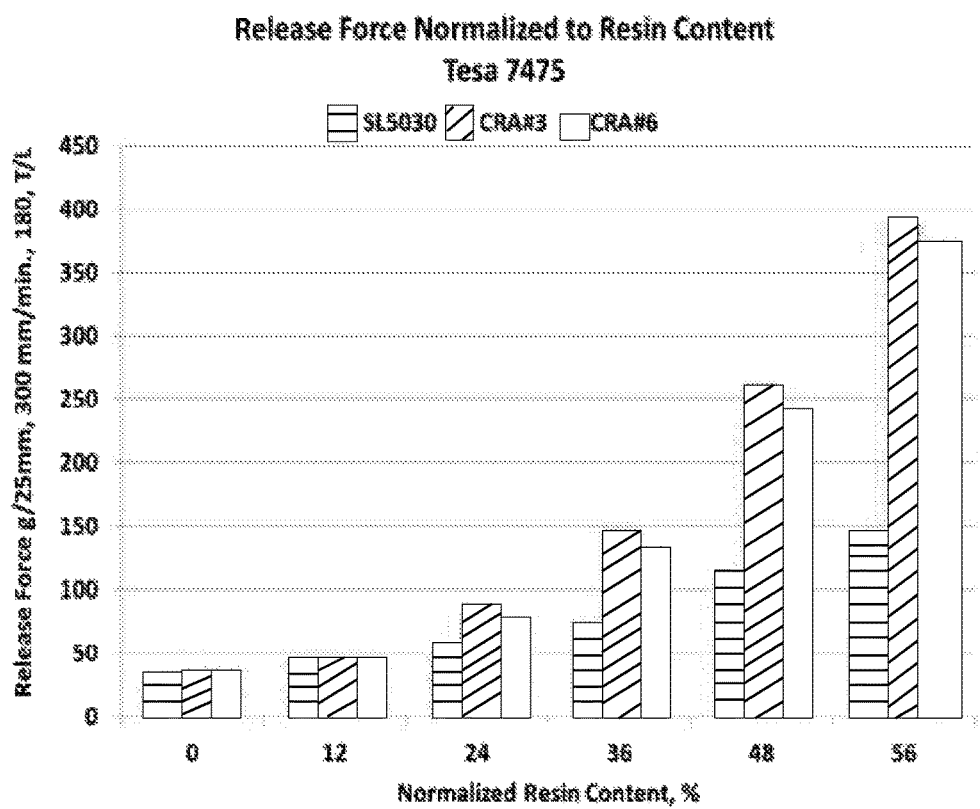
FIG. 1 is graph showing normalized release force to resin content of various release modifiers using Tesa 7475 tape.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Release coatings are comprised of a base polymer, a cross-linker, an inhibitor and curing catalyst. To modify the release force to remove a label from a release liner a modifier additive is included in the release coating formulation.

Disclosed herein is a curable siloxane composition, which provides upon curing a release layer or film with improved modified release properties on such substrates such as engineering paper, asphalt package paper, different releasing double-surface peeling paper, etc., as well as tapes, labels, etc., which require an appropriate level of releasing property. The release modifier disclosed herein provides improved environmental properties by reducing the amount of volatiles released during curing of the composition.

Typically, the efficiency of a release modifier of controlled release additive is dependent on the silicone resin content of the release modifier. Release modifiers not containing a reactive diluent contain lower levels (<50%) of silicone resin which results in lower efficiency to modify a formulated release force in a release coating. Release modifier compositions at higher resin content (≥50%) containing an α-olefin or vinyl-ether have higher efficiency to modify a release coating. However, higher efficiency release modifier compositions containing α-olefin or vinyl-ether emit volatiles which are oxidized and then exhausted to the atmosphere creating an undesirable environmental emission as smoke.

Disclosed herein are control release additives or release modifiers that possess higher efficiency of release force modification and have lower emissions during curing.

Base Polymer

The base polymer used for coating disclosed herein is a substantially linear or branched alkenyl curable silicone composition of the formula:

$$M^{vi}_a T_b D_c M_d$$

where $M^{vi}=R_{3-p}R^1_p SiO_{1/2}$, where R is selected from the group consisting of one to forty carbon monovalent hydrocarbon radicals and $R^1$ is selected from the group consisting of two to forty carbon atom olefinic monovalent hydrocarbon radicals, where p ranges from 1 to 3; $T=R^2 SiO_{3/2}$ where $R^2$ is selected from the group consisting of R and $R^1$; $D=R^3 R^4 SiO_{2/2}$ where $R^3$ and $R^4$ are each independently selected from the group consisting of R and $R^1$; and $M=R_3 SiO_{1/2}$ where each R is independently selected, and the subscripts a has values ranging from about 2 to about 5, preferably from about 2 to 4, more preferably from about 2 to 3, b has values ranging from about 0 to 5, preferably from about 0 to 4 and more preferably from about 0 to 3, c is an integer ranging from about 50 to about 1,000, preferably from about 75 to 800, more preferably from about 100 to 500 and d has a value ranging from 0 to 1.0, preferably from 0 to about 0.5, more preferably from about 0 to about 0.25 and most preferably from about 0.1 to about 0.25. The term substantially linear or branched to means that the average number of T branching sites per alkenyl silicone molecule is from about 0 to 5, preferably from about 0 to 4 and more preferably from 0 to 3.

In embodiments, R is preferably methyl or phenyl. In embodiments $R^1$ is preferably vinyl.

The amount of the base polymer in the composition is from about 0 weight percent to about 90 weight percent, or in embodiments from about 10 weight percent to about 90 weight percent or from about 20 weight percent to about 80 weight percent.

Cross-Linker

In embodiments, the composition disclosed herein includes a cross-linker. The cross-linker is a substantially linear hydrogen siloxane selected from the group of compounds:

$$MD_e D'_f M$$

$$MD'_f M$$

$$MD_e D'_f M'$$

$$M'D_e D'_f M', \text{ and}$$

$$MD_e M'$$

where M is $R_3 SiO_{1/2}$
and
$M'=H_g R_{3-g} SiO_{1/2}$;
$D=RRSiO_{2/2}$ where each R is independently selected, and
$D'=RHSiO_{2/2}$
where R is as previously defined, the subscripts e and f may be zero or positive wherein the sum of e and f ranges from about 10 to about 100, preferably from about 10 to 80, more preferably from about 10 to 60 and g ranges from about 0 to 1, subject to the limitation that the sum of f and g is two or greater.

The amount of the cross-linker in the composition is from about 1.8 weight percent to about 17.0 weight percent, or in embodiments from about 1.8 weight percent to about 16.0 weight percent or from about 2.1 weight percent to about 15 weight percent.

Catalyst

The curable coating includes a hydrosilylation catalyst. The hydrosilation catalyst is a metal selected from the group consisting of nickel, palladium, platinum, rhodium, iridium, ruthenium and osmium.

A typical platinum-containing catalyst component in the organopolysiloxane compositions of this invention is any form of chloroplatinic acid, such as, for example, the readily available hexahydrate form or the anhydrous form, because of its easy dispersibility in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum-containing catalyst component that is used in the compositions disclosed herein is not narrowly limited as long as there is a sufficient amount to accelerate a room temperature reaction between the silicon-bonded hydrogen atoms of the cross-linker with the silicon-bonded olefinic hydrocarbon radicals of the base polymer. The exact necessary amount of said catalyst component will depend upon the particular catalyst and is not easily predictable. However, for chloroplatinic acid said amount can be as low as one part by weight of platinum for every one million parts by weight of the base polymer. Preferably said amount is at least 10 parts by weight, on the same basis.

For compositions of this invention which are to be used in the coating method of this invention the amount of platinum containing catalyst component to be used is preferably sufficient to provide from 10 to 500 parts by weight platinum per one million parts by weight of organopolysiloxane provided by the base polymer and the cross-linker Inhibitor The curable coating disclosed herein includes a cure inhibitor. The cure inhibitors may include any combination of ethylenically unsaturated amides, aromatically unsaturated amides, acetylenic compounds, ethylenically unsaturated isocyanates, olefinic siloxanes, unsaturated hydrocarbon diesters unsaturated hydrocarbon monoesters of unsaturated acids, conjugated ene-ynes, hydroperoxides, ketones, sulfoxides, amines, phosphines, phosphites, nitrites, and diaziridines. In embodiments, inhibitors for the compositions disclosed herein are the maleates and alkynyl alcohols.

Inhibitors, for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420 and 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes. U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitrites, U.S. Pat. No. 3,344,111; diaziridines, U.S. Pat. No. 4,043,977; half esters and half amides, U.S. Pat. No. 4,533,575; and various salts, such as U.S. Pat. No. 3,461,185.

The amount of inhibitor used in the compositions disclosed herein is not critical and can be any amount that will retard the above-described platinum-catalyzed hydrosilylation reaction at room temperature while not preventing said reaction at moderately elevated temperature, i.e. a temperature that is 25° C. to 50° C. above room temperature. No specific amount of inhibitor can be suggested to obtain a specified bath life at room temperature since the desired amount of any particular inhibitor to be used will depend upon the concentration and type of the platinum group metal-containing catalyst, the nature and amounts other components of the composition. The amount of the inhibitor in the composition is from about 0.1 weight percent to about 10 weight percent, or in embodiments from about 0.15 weight percent to about 2 weight percent or from about 0.2 weight percent to about 1 weight percent.

Coating Release Additive

The release layer composition includes a release modifier to control the release properties. The release modifier includes an alkenyl silsesquioxane, an organo functional siloxane and an optional reactive diluent.

In embodiments, the alkenyl silsesquioxane is a vinyl terminated polyorganosiloxane with structures selected from $M_xM^{Vi}_yQ$ or $M_xD^{Vi}_zQ$ where x and y range from 0.6 to 1.2, preferably from about 0.7 to 1.0, more preferably 0.7 to 0.9, and z is 0.05 to 0.25; preferably 0.10 to 0.20, more preferably 0.15 to 0.20, M represents $R^6_3SiO_{1/2}$, $D^{Vi}$ represents $R^6ViSiO_{2/2}$, Q represents $SiO_{4/2}$, $R^6$ is alkyl of 1 to 40 carbon atoms and Vi is vinyl.

The organo functional siloxane is represented by $MD_xM$, wherein M represents $R^5_3SiO_{1/2}$, D represents $R^5_2SiO_{2/2}$, where $R^5$ is alkyl, alkenyl, of 1 to 40 carbon atoms, or hydrogen and x is from about 5 to about 80. In embodiments, the organo functional siloxane can include additional siloxanes of the formula disclosed where $R^5$ is hydrogen functional. The organo functional siloxane has a viscosity of from about 5 centipoises to about 80 centipoises, or in embodiments from 5 centipoises to 50 centipoises. The viscosity is controlled through equilibration or hydrolysis.

The optional reactive diluent is an α-olefin such as 1-octadecene, 1-dodecene, 1-tetradecene, 1-hexandecene, vinyl cyclohexane or vinyl ether such as dodecyl vinyl ether, ethyl hexyl vinyl ether, cyclohexyl vinyl ether, butanediol mono and divinyl ether, diethylene glycol vinyl ether.

The compositions of the present invention may be used either as formulations that are free of solvent, i.e. 100% solids, diluted with an organic solvent that is miscible, or as an aqueous emulsion, i.e. a silicone and water emulsion.

The amount of the coating release additive in the composition is from about 10 weight percent to about 100 weight percent, or in embodiments from about 20 weight percent to about 90 weight percent or from about 20 weight percent to about 80 weight percent.

It is generally appreciated that other components may be added to the compositions of the present invention such as bath life extenders of U.S. Pat. Nos. 5,036,117 and 5,516,558; release additives for increasing the release force; fillers, extenders, reactive diluents, anchorage additives that improve adhesion to specific substrates, and the like.

When used as emulsions, the compositions of the present invention are generally emulsified by the addition of non-ionic surfactants, addition of water followed by processing in a colloid mill.

In embodiments, laminates disclosed herein can include a substrate, a cured release coating including coated upon the substrate and a pressure sensitive adhesive. The laminates disclosed herein may include a substrate, the cured release coating, a pressure sensitive adhesive and an additional laminate layer which may include a single layer or a plurality of layers. The materials useful as the substrate layer and as the layer or layers in contact with the pressure sensitive adhesive are selected from the group consisting of cellulose based substrates such as paper, film based substrates such as polyolefin films, polyester films, polyamide films and polyurethane films, and cellulose based substrates that have been coated with film forming materials derived from polyolefins, polyesters, polyamides and polyurethanes. The laminates are useful as transfer tapes or sheets facilitating the transfer of the pressure sensitive adhesive from the laminate comprising the cured release coating to a second substrate which may be a single layer of material or a laminate including two or more layers. These releasable compositions may be used in devices where a release layer is desired such as transdermal patches, band-aids and other medical appliances.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The following examples are designed to illustrate the present invention and are not to be construed as limiting the invention as embodied in these specific examples.

Modifier Preparation Process

To a 5 L flask equipped with agitation, thermal controller and vacuum a siloxane resin, siloxane fluid(s) and an α-olefin or vinyl-ether were added. The pressure in the flask was reduced to 1 torr while heating at about 110° C. to about 120° C. for two hours. The temperature was reduced to 25° C. and an inhibitor was added.

Examples 1-4

Table 1 details siloxane physical properties used in Examples 1-5 release modifier compositions. Release modifier compositions for examples 1-5 are shown in Table 2 and the physical properties of each in Table 3. These release modifiers were formulated into release coatings as shown in Table 4. The vinyl siloxane SL6900, available from Momentive Performance Materials, is a vinyl-terminated dimethylsiloxane having a viscosity of from about 100 centipoises to about 160 centipoises. SL5030, available from Momentive Performance Materials, was selected for Comparison Release Modifier. The Comparison Release Modifier is a 1.4 weight percent vinyl high efficiency release modifier having approximately 60 weight percent of a vinyl functional MQ resin and 35 weight percent α-olefin. The disadvantages provided by the Comparison Release Modifier include foam generation during the coating process and excess oxidative exhaust generated in the curing ovens/oxidizers from the high concentration of α-olefin.

Formulations were coated on glassine at 1.6 grams per square meter (gsm) and cured for about 1 minute at 320° C. All coatings were aged two weeks then Tesa 7475 tape was applied and aged for about 20 hours at 70° C. Tapes were then equilibrated at 25° C. and 50 percent relative humidity for about 30 minutes followed by release testing at 300 mm/minute, 180° tape from liner. Values are as g/25 mm.

Examples 1 and 2 demonstrate improved modifier efficiency when vinyl-terminated siloxanes are lower in polymeric chain length with the corresponding lower viscosity, higher vinyl content. Further comparison of CRA#2 with 3 and 4 demonstrated polydimethylmethylhydrogen siloxanes as additive to the release modifiers demonstrated increased efficiency of the release modifier.

TABLE 1

Siloxane Physical Properties used in Modifier Compositions

| CRA Siloxanes | Viscosity, cstk. | Vinyl, wt % | Hydride, wt % |
|---|---|---|---|
| $M^{Vi}D_{31}M^{Vi}$ | 28 | 2.17 | |
| $M^{Vi}D_{80}M^{Vi}$ | 120 | 0.88 | |
| $MD_{17}D^{H}_{4}M$ | 8.1 | | 0.24 |
| $M^{H}D_{25}M^{H}$ | 18 | | 0.10 |

TABLE 2

Release Modifier Compositions

| Modifier | Siloxane ID | Wt % Siloxane | Wt % $M^{Vi}D_{80}M^{Vi}$ | Wt % $MD^{Vi}Q$ | Tetradecene |
|---|---|---|---|---|---|
| CRA#1 | $M^{Vi}D_{31}M^{Vi}$ | 14.5 | 19.4 | 58 | 8 |
| CRA#2 | $M^{Vi}D_{31}M^{Vi}$ | 33.9 | | 58 | 8 |
| CRA#3 | $MD_{17}D^{H}_{4}M$ | 33.9 | | 58 | 8 |
| CRA#4 | $M^{H}D_{25}M^{H}$ | 33.9 | | 58 | 8 |

TABLE 3

Release Modifier Properties

| Modifier | Wt % solids | Viscosity, cps. | Wt % Vinyl | Wt % Hydride |
|---|---|---|---|---|
| CRA#1 | 90.8 | 4500 | 1.9 | — |
| CRA#2 | 91.0 | 3850 | 2.16 | — |
| CRA#3 | 91.8 | 4300 | 1.44 | 0.0860 |
| CRA#4 | 90.2 | 3540 | 1.55 | 0.0233 |

TABLE 4

Release Force for Release Coating Formulations with Release Modifiers

| | No Modifier | 1 | 2 | 3 | 4 | Comparison Ex. 1 |
|---|---|---|---|---|---|---|
| SL6900 | 100 | 50 | 50 | 50 | 50 | 50 |
| Surfynol S-61 | 0.25 | 0.25 | 0.25 | 0.25 | 0.25 | 0.25 |
| SS4300c | 3.9 | 6.0 | 6.5 | 2.3 | 5.2 | 5.2 |
| SL6310 | 2.7 | 2.7 | 2.7 | 2.6 | 2.7 | 2.7 |
| CRA#1 | | 50 | | | | |
| CRA#2 | | | 50 | | | |
| CRA#3 | | | | 50 | | |
| CRA#4 | | | | | 50 | |
| SL5030 | | | | | | 50 |
| SiH/Vi = | 1.9 | 1.9 | 1.9 | 1.9 | 1.9 | 1.9 |
| ppmPt = | 125 | 125 | 125 | 125 | 125 | 125 |
| Tesa 7475 20 hr 70 C. | 31 | 50 | 89 | 204 | 137 | 137 |

Examples 5-12

Release modifiers CRA#3 and CRA#4 from Examples 3 and 4 were further evaluated for release modifier efficiency at deferent concentrations as shown Tables 5 and 6. These release modifiers were compared to commercial modifiers SL5030 (described in Examples 1-4) and SL6030 (Comparison Ex. 2). SL6030 is comprised of 42 weight percent vinyl-terminated siloxane of approximately 200-300 centistokes, 50 weight percent vinyl functional MQ resin and 8 weight percent α-olefin. SL6030 is not as efficient as a release modifier as SL5030. Further SL5030 and SL6030 generate foam during the coating operations although SL6030 emits a lower amount of volatiles that are oxidized and released to the atmosphere.

Table 5 and 6 show release modifier compositions containing a low viscosity silicone-hydride polysiloxane. The low viscosity silicone-hydride polysiloxane offers improved release force modification than prior art modifiers. This is further shown in Table 7 when these modifiers and commercial products are compared for release force when the release coating formulation composition contains the same vinyl functional silicone resin composition at the same concentration.

TABLE 5

Release Formulations with Release Modifier CRA#3

|  | 5 | 6 | 7 | 8 | Comparison Ex. 1 | Comparison Ex. 2 |
|---|---|---|---|---|---|---|
| SL6900 | 90 | 70 | 50 | 30 | 50 | 40 |
| Surfynol S-61 | 0.25 | 0.25 | 0.25 | 0.25 | 0.25 | 0.25 |
| SS4300c | 3.5 | 2.9 | 2.4 | 1.8 | 5.2 | 5.8 |
| SL6310 | 2.7 | 2.7 | 2.7 | 2.7 | 2.7 | 2.7 |
| CRA#3 | 10 | 30 | 50 | 70 | | |
| SL5030 | | | | | 50 | |
| SL6030 | | | | | | 60 |
| SiH/Vi = | 1.9 | 1.9 | 1.9 | 1.9 | 1.9 | 1.9 |
| ppmPt = | 125 | 125 | 125 | 125 | 125 | 125 |
| Tesa 7475 20 hr 70 C. | 25 | 62 | 215 | 557 | 137 | 106 |

TABLE 6

Release Formulations with Release Modifier CRA#4

|  | 9 | 10 | 11 | 12 | Comparison Ex. 1 | Comparison Ex. 2 |
|---|---|---|---|---|---|---|
| SL6900 | 90 | 70 | 50 | 30 | 50 | 40 |
| Surfynol S-61 | 0.25 | 0.25 | 0.25 | 0.25 | 0.25 | 0.25 |
| SS4300c | 3.9 | 4.2 | 4.5 | 4.8 | 5.1 | 5.6 |
| SL6310 | 2.7 | 2.7 | 2.7 | 2.7 | 2.7 | 2.7 |
| CRA#4 | 10 | 30 | 50 | 70 | | |
| SL5030 | | | | | 50 | |
| SL6030 | | | | | | 60 |
| SiH/Vi = | 1.9 | 1.9 | 1.9 | 1.9 | 1.9 | 1.9 |
| ppmPt = | 125 | 125 | 125 | 125 | 125 | 125 |
| Tesa 7475 20 hr 70 C. | 21 | 42 | 137 | 297 | 137 | 106 |

TABLE 7

Release Force at constant Siloxane Resin Content in Release Formulation

| Resin % | CRA#3 | CRA#4 | SL5030 | SL6030 |
|---|---|---|---|---|
| 30 | 205 | 137 | 137 | 106 |

Example 13

Release modifier CRA#5 was prepared as previously described with the composition shown in Table 8. The viscosity was 5,683 cps at 92.0 weight percent solids and weight percent vinyl was 1.56 with 0.1296 weight percent hydride. This modifier was formulated into the release coating as shown in Table 9 along with Comparison Example 1. The formulations were diluted to 20 weight percent solids in heptane and coated using a #3 Myer rod onto glassine. Tesa 7475 was applied the following day and aged 20 hours at 70° C. At equivalent silicone resin content in the release coating formulation CRA#5 showed a higher release force than the control SL5030.

A release coating was prepared using the siloxane $M^{Vi}D_{20}M^{Vi}$ with Surfynol S-61 inhibitor, SS4300c a 1 weight percent hydride homopolymer for an SiH/Vi=1.9, at 125 ppm platinum diluted in heptane. Release force was determined to be 18 g/25 mm which is similar to the SL6900 formulation without a modifier. However, when the release modifier compositions included the resin, the compositions provided excellent coverage and efficiency for modifying the release force demonstrating these low viscosity fluids in release modifiers improve the modifier efficiency.

TABLE 8

Release Modifier CRA#5 Composition

| Modifier | Siloxane | Wt % Siloxane | Wt % $M^H_4Q$ | Wt % $MD^{Vi}Q$ | Wt % 1-Tetradecene |
|---|---|---|---|---|---|
| CRA#5 | $M^{Vi}D_{20}M^{Vi}$ | 22.7 | 10.9 | 59.1 | 7.3 |

TABLE 9

Release Formulations with Release Modifier Release Force

|  | 13 | Comparison Ex. 1 |
|---|---|---|
| SL6900 | 50 | 50 |
| Surfynol S-61 | 0.25 | 0.25 |
| SS4300c | 5.3 | 5.2 |
| SL6310 | 2.5 | 2.5 |
| CRA#5 | 50 | |
| SL5030 | | 50 |
| SiH/Vi= | 1.9 | 1.9 |
| ppmPt= | 125 | 125 |
| Tesa 7475 20 hr 70 C. | 371 | 280 |

Examples 14-21

These examples show that release modifier compositions incorporating low viscosity vinyl and hydride functional siloxanes offer high efficiency release modifiers. Release modifiers were prepared as described above from low viscosity vinyl-terminated siloxane and hydride functional siloxane for release modifiers CRA #6-7 where the vinyl functional silixoxane resin is either the vinyl group is on-chain or terminal position. Release coating formulations were coated onto PET film and cured 1 minute at 150° C.

TABLE 8

Siloxane Physical Properties used in Modifier Compositions

| Siloxane | Viscosity, cstk. | Wt % Vinyl | Wt % Hydride |
|---|---|---|---|
| $M^{Vi}D_{20}M^{Vi}$ | 22 | 3.23 | |
| $MD^H_{25}M$ | 9.8 | | 1.55 |

TABLE 9

Release Modifier Composition

| Modifier | Siloxane 1 | Siloxane 2 | Wt % Siloxane 1 | Wt % Siloxane 2 | Wt % $MD^{Vi}Q$ | Wt % $M^{Vi}MQ$ | Wt % 1-Tetradecene |
|---|---|---|---|---|---|---|---|
| CRA#6 | $M^{Vi}D_{20}M^{Vi}$ | $MD^H_{25}M$ | 21.7 | 6.8 | 63.2 | | 8.3 |
| CRA#7 | $M^{Vi}D_{20}M^{Vi}$ | $MD^H_{25}M$ | 21.7 | 6.8 | | 63.2 | 8.3 |

TABLE 10

Release Formulations with Release Modifier Release Force

| | 14 | 15 | 16 | 17 | 18 | 19 | 20 | 21 | Comparison Ex. 1 | Comparison Ex. 2 |
|---|---|---|---|---|---|---|---|---|---|---|
| SL6900 | 4.5 | 3.5 | 2.5 | 1.5 | 4.5 | 3.5 | 2.5 | 1.5 | 2.5 | 2.5 |
| SS4300c | 0.18 | 0.2 | 0.22 | 0.24 | 0.18 | 0.2 | 0.22 | 0.24 | 0.27 | 0.26 |
| S-61 | 0 | | | | 0 | | | | | |
| CRA#:6 | 0.5 | 1.5 | 2.5 | 3.5 | | | | | | |
| CRA#:7 | | | | | 0.5 | 1.5 | 2.5 | 3.5 | | |
| SL6030 | | | | | | | | | 2.5 | |
| SL5030 | | | | | | | | | | 2.5 |
| SL6310 | 0.13 | 0.13 | 0.13 | 0.13 | 0.13 | 0.13 | 0.13 | 0.13 | 0.13 | 0.13 |
| Heptane | 50 | 50 | 50 | 50 | 50 | 50 | 50 | 50 | 50 | 50 |
| SiH/Vi = | 1.90 | 1.90 | 1.90 | 1.90 | 1.90 | 1.90 | 1.90 | 1.90 | 1.90 | 1.90 |
| ppmPt = | 125 | 125 | 125 | 125 | 125 | 125 | 125 | 125 | 125 | 125 |
| Tesa 7475 20 hr 70 C. | 17 | 51 | 232 | 669 | 15 | 48 | 117 | 353 | 137 | 106 |

Examples 22-33

Release modifiers CRA#2, CRA#3, CRA#6 and SL5030 were formulated into release coating formulations at different concentrations. Release formulations were coated on glassine using a five-roll coater and cured 2.4 second oven dwell time with an exit web temperature of 160° C. Release modification results using an acrylic and rubber based test tapes from Tesa Corporation are shown in Tables 11-13 wherein the disclosed compositions demonstrated higher efficiency as release modifiers than prior art.

TABLE 11

Release Formulations with Higher Efficiency Modifier Compositions

| | No Modifier | Comparison Ex. 3 | Comparison Ex. 4 | Comparison Ex. 5 | Comparison Ex. 6 | 22 | 23 | 24 | 25 |
|---|---|---|---|---|---|---|---|---|---|
| SL6900 | 100 | 80 | 60 | 40 | 20 | 80 | 60 | 40 | 20 |
| Surfynol S-61 | 0.25 | 0.25 | 0.25 | 0.25 | 0.25 | 0.25 | 0.25 | 0.25 | 0.25 |
| SS4300C | 4.63 | 5.27 | 5.90 | 6.55 | 7.18 | 6.06 | 7.50 | 8.95 | 10.35 |
| SL6310 | 2.20 | 2.20 | 2.20 | 2.20 | 2.20 | 2.20 | 2.20 | 2.20 | 2.20 |
| SL5030 | — | 20 | 40 | 60 | 80 | — | — | — | — |
| CRA#6 | — | — | — | — | — | 20 | 40 | 60 | 80 |
| CRA#2 | — | — | — | — | — | — | — | — | — |
| CRA#3 | — | — | — | — | — | — | — | — | — |
| ppm Pt | 100 | 100 | 100 | 100 | 100 | 100 | 100 | 100 | 100 |
| SiH:Vi | 2.25 | 2.25 | 2.25 | 2.25 | 2.25 | 2.25 | 2.25 | 2.25 | 2.25 |
| Tesa 7475 | 34 | 51 | 93 | 194 | 325 | 63 | 151 | 428 | 1277 |
| Tesa 4154 | 8 | 27 | 71 | 185 | 323 | 28 | 107 | 373 | 573 |

TABLE 12

Release Formulations with Higher Efficiency Modifier Compositions

| | No Modifier | Comparison Ex. 3 | Comparison Ex. 4 | Comparison Ex. 5 | Comparison Ex. 6 | 26 | 27 | 28 | 29 |
|---|---|---|---|---|---|---|---|---|---|
| SL6900 | 100 | 80 | 60 | 40 | 20 | 80 | 60 | 40 | 20 |
| Surfynol S-61 | 0.25 | 0.25 | 0.25 | 0.25 | 0.25 | 0.25 | 0.25 | 0.25 | 0.25 |
| SS4300C | 4.63 | 5.27 | 5.90 | 6.55 | 7.18 | 4.02 | 3.40 | 2.78 | 2.15 |
| SL6310 | 2.20 | 2.20 | 2.20 | 2.20 | 2.20 | 2.20 | 2.20 | 2.20 | 2.20 |
| SL5030 | — | 20 | 40 | 60 | 80 | — | — | — | — |
| CRA#6 | — | — | — | — | — | — | — | — | — |
| CRA#2 | — | — | — | — | — | 20 | 40 | 60 | 80 |
| CRA#3 | — | — | — | — | — | — | — | — | — |
| ppm Pt | 100 | 100 | 100 | 100 | 100 | 100 | 100 | 100 | 100 |
| SiH:Vi | 2.25 | 2.25 | 2.25 | 2.25 | 2.25 | 2.25 | 2.25 | 2.25 | 2.25 |
| Tesa 7475 | 34 | 51 | 93 | 194 | 325 | 63 | 172 | 444 | 1182 |
| Tesa 4154 | 8 | 27 | 71 | 185 | 323 | 29 | 115 | 377 | 592 |

TABLE 13

Release Formulations with Higher Efficiency Modifier Compositions

|  | No Modifier | Comparison Ex. 3 | Comparison Ex. 4 | Comparison Ex. 5 | Comparison Ex. 6 | 30 | 31 | 32 | 33 |
|---|---|---|---|---|---|---|---|---|---|
| SL6900 | 100 | 80 | 60 | 40 | 20 | 80 | 60 | 40 | 20 |
| Surfynol S-61 | 0.25 | 0.25 | 0.25 | 0.25 | 0.25 | 0.25 | 0.25 | 0.25 | 0.25 |
| SS4300C | 4.63 | 5.27 | 5.90 | 6.55 | 7.18 | 4.02 | 3.40 | 2.78 | 2.15 |
| SL6310 | 2.20 | 2.20 | 2.20 | 2.20 | 2.20 | 2.20 | 2.20 | 2.20 | 2.20 |
| SL5030 | — | 20 | 40 | 60 | 80 | — | — | — | — |
| CRA#6 | — | — | — | — | — | — | — | — | — |
| CRA#2 | — | — | — | — | — | — | — | — | — |
| CRA#3 | — | — | — | — | — | 20 | 40 | 60 | 80 |
| ppm Pt | 100 | 100 | 100 | 100 | 100 | 100 | 100 | 100 | 100 |
| SiH:Vi | 2.25 | 2.25 | 2.25 | 2.25 | 2.25 | 2.25 | 2.25 | 2.25 | 2.25 |
| Tesa 7475 | 34 | 51 | 93 | 194 | 325 | 71 | 282 | 599 | 994 |
| Tesa 4154 | 8 | 27 | 71 | 185 | 323 | 24 | 66 | 233 | 507 |

Example 34

Prior art high efficiency modifiers with α-olefin as a diluent in high speed coating operations where shearing occurs develops foam to varying degrees. The compositions of this disclosure were found to develop less foam and defoam more rapidly than prior art modifiers. This was demonstrated by high shear mixing 250 ml of modifier for 2 minutes then placing in 500 ml beaker and allowed to set undisturbed 30 minutes. At the 28 minute point in time a second 250 ml was sheared then placed into a second 500 ml beaker.

Table 14 results demonstrated disclosed modifiers compositions have improved decreased foam generation and defoaming properties critical in high speed coating operations where foam can introduce coating defects effecting release quality.

TABLE 14

Release Modifier Foam Control

| Modifier | Initial Foam Volume | 30 minute Volume % Foam |
|---|---|---|
| SL5030 | 475 | 60 |
| SL6030 | 300 | 25 |
| CRA# 6 | 275 | <5 |

Examples 35-38

Release modifiers having a low viscosity, low molecular weight vinyl-functional siloxane are shown in Table 15. These modifiers were prepared from vinyl-terminated siloxane polymers having polymeric chain lengths from 10 to 80 dimethylsiloxy units demonstrate higher modifier efficiency when the chain length is less than 115 units. Olefin free high efficiency modifier compositions to eliminate VOC compounds leading to oxidized exhaust are obtained when either low viscosity vinyl or hydride functional siloxanes are in modifier compositions as CRA#8 demonstrates. SL5000 is a 435 cstk. vinyl-terminated siloxane of 0.9 weight percent vinyl, SL5040 is a maleate inhibitor and SL5010 is a 300 ppm platinum catalyst commercial product.

TABLE 15

Siloxane Physical Properties used in Modifier Compositions

| Siloxane | Viscosity, cstk. | Wt % Vinyl |
|---|---|---|
| $M^{Vi}D_{10}M^{Vi}$ | 7 | 5.81 |
| $M^{Vi}D_{50}M^{Vi}$ | 75 | 1.38 |
| $M^{Vi}D_{80}M^{Vi}$ | 130 | 0.88 |
| $M^{Vi}D_{115}M^{Vi}$ | 255 | 0.62 |

TABLE 16

Release Modifier Compositions

| Modifier | Siloxane | Wt % Siloxane | Wt % $MD^{Vi}Q$ | Wt % 1-Tetradecene | Viscosity, cps |
|---|---|---|---|---|---|
| CRA#8 | $M^{Vi}D_{10}M^{Vi}$ | 40 | 60 | | 5760 |
| CRA#9 | $M^{Vi}D_{50}M^{Vi}$ | 40 | 60 | | 100,000 |
| CRA#10 | $M^{Vi}D_{50}M^{Vi}$ | 36 | 54 | 10 | 530 |
| CRA#11 | $M^{Vi}D_{80}M^{Vi}$ | 36 | 54 | 10 | 750 |
| Comparison Ex. 7 | $M^{Vi}D_{115}M^{Vi}$ | 36 | 54 | 10 | 5330 |

TABLE 17

Release Formulations and Release Force

|  | 35 | 36 | 37 | 38 | Comparison Ex. 7 |
|---|---|---|---|---|---|
| SL5000 | 16.67 | 16.67 | 16.67 | 16.67 | 16.67 |
| CRA#8 | 50 | | | | |
| CRA#9 | | 50 | | | |
| CRA#10 | | | 55.6 | | |
| CRA#11 | | | | 55.6 | |
| Comparison CRA | | | | | 55.6 |
| SL5040 | 0.67 | 0.67 | 0.67 | 0.67 | 0.67 |
| SL5010 | 33.33 | 33.33 | 33.33 | 33.33 | 33.33 |
| SS4300c | 8.3 | 6.1 | 6.1 | 6.1 | 6.1 |
| SiH:Vi | 1.74 | 1.74 | 1.74 | 1.74 | 1.74 |
| Pt ppm | 100 | 100 | 100 | 100 | 100 |
| Tesa 4154 | 318 | 366 | 255 | 285 | 146 |

Examples 39-44

Release modifiers having a low viscosity, low molecular weight vinyl-functional siloxane are shown in Table 18.

TABLE 18

Siloxane Physical Properties used in Modifier Compositions

| Siloxane | Viscosity, cstk. | Wt % Vinyl |
|---|---|---|
| $M^{Vi}D_{10}M^{Vi}$ | 7 | 5.81 |

TABLE 19

Release Modifier Composition

| Modifier | Siloxane | Wt % Siloxane | Wt % $MD^{Vi}Q$ | Wt % 1-Tetradecene | Viscosity, cP. |
|---|---|---|---|---|---|
| CRA#12 | $M^{Vi}D_{10}M^{Vi}$ | 30 | 65 | 4 | 3840 |

TABLE 20

Release Formulations and Release Force

|  | No Modifier | 39 | 40 | 41 | 42 | 43 | 44 |
|---|---|---|---|---|---|---|---|
| SL6900 | 100 | 90 | 80 | 60 | 40 | 20 | 0 |
| Surfynol S-61 | 0.25 | 0.25 | 0.25 | 0.25 | 0.25 | 0.25 | 0.25 |
| SS4300C | 4.63 | 5.87 | 7.10 | 9.60 | 12.05 | 14.55 | 17.00 |
| SL6310 | 2.20 | 2.20 | 2.20 | 2.20 | 2.20 | 2.20 | 2.20 |
| CRA#12 | — | 10 | 20 | 40 | 60 | 80 | 100 |
| ppm Pt | 100 | 100 | 100 | 100 | 100 | 100 | 100 |
| SiH:Vi | 2.25 | 2.25 | 2.25 | 2.25 | 2.25 | 2.25 | 2.25 |
| Tesa 7475 | 34 | 63 | 173 | 469 | 1310 | 4238 | 11945 |

Example 45

Foam testing of 250 ml of Comparison Ex. 1 CRA, Comparison Ex. 2 CRA and CRA#6 were mixed two minutes at high shear rate then poured into a 500 ml graduated cylinder. Table 21 shows that modifiers of the disclosed herein have reduced tendency to foam and defoam more completely than prior art release modifiers.

TABLE 21

Foam Testing

| | Initial mls | 30 Minute Liquid, mls | 30 Minute Foam, mls |
|---|---|---|---|
| Comparison Ex. 1 CRA | 390 | 265 | 80 |
| Comparison Ex. 2 CRA | 360 | 250 | 50 |
| CRA#6 | 300 | 240 | 15 |

Example 46

Smoke emission testing was conducted by placing 0.5 g of CRA sample into an aluminum pan, placing the pan on a hot plate at room temperature. Glass cylinders where then placed over the pans and the hot plate was heated to 230° C. and videotaped. The smoke emission testing showed a high concentration of volatiles from Comparison Ex. 1 CRA and an insignificant amount of volatiles from CRA#6.

Figure 2:
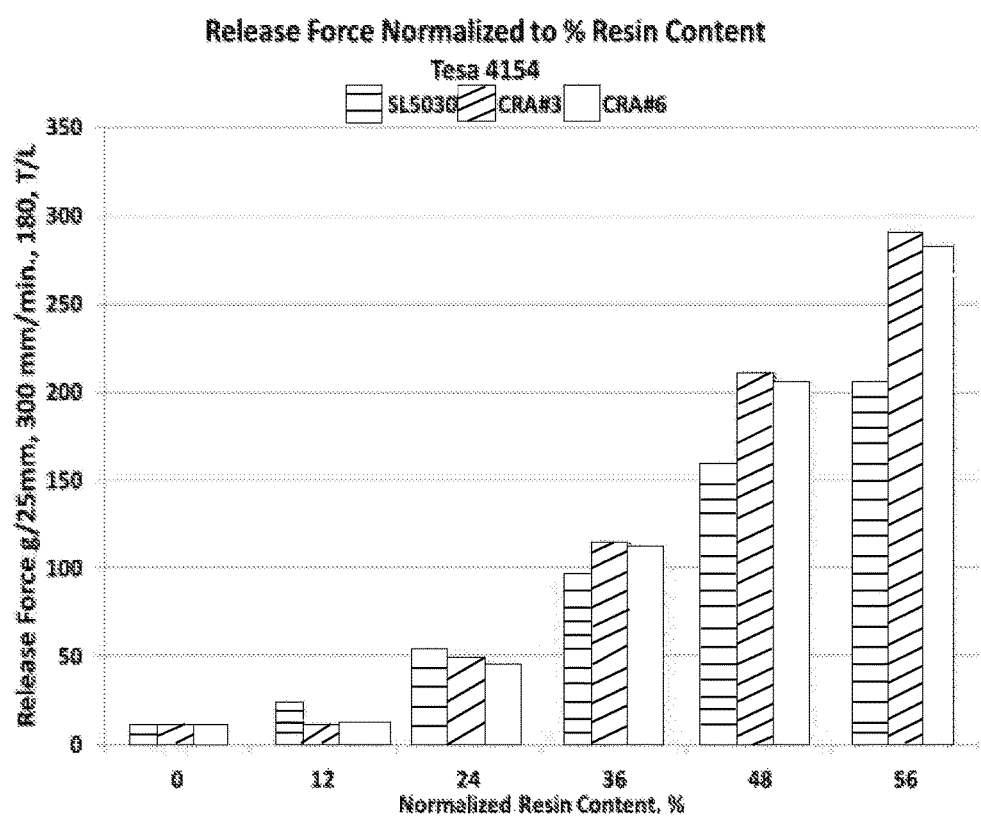
FIG. 2 is graph showing normalized release force to resin content of various release modifiers using Tesa 4154 tape.

In FIGS. 1 and 2 the silicone resin in CRA#3 and CRA#6 demonstrated higher release force modification than the commercial product SL5030 at similar resin content in the release coating formulation formulated into a modifier based on silicone fluids below 100 centistokes This unexpected synergistic improvement in modifier efficiency to increase release force was unanticipated.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A release modifier comprising:
   i) an alkenyl functional silicone resin represented by structures chosen from $M_xM^{Vi}_yQ$ or $M_xD^{Vi}_zQ$ where the sum of x and y range from 0.6 to 1.2, z is 0.05 to 0.25, M represents $R^6_3SiO_{1/2}$, $M^{Vi}$ represents $R_{3-p}R^1_pSiO_{1/2}$, $D^{Vi}$ represents $R^6ViSiO_{2/2}$, Q represents $SiO_{4/2}$, R is selected from the group consisting of one to forty carbon monovalent hydrocarbon radicals, $R^1$ is selected from the group consisting of two to forty carbon atom olefinic monovalent hydrocarbon radicals, p ranges from 1 to 3, $R^6$ is alkyl of 1 to 40 carbon atoms,
   ii) one or more organo functional siloxanes of the formula $MD_xM$, wherein M represents $R^5_3SiO_{1/2}$, D represents $R^5_2SiO_{2/2}$, wherein $R^5$ is alkyl or alkenyl of 1 to 40 carbon atoms, or hydrogen wherein the organofunctional siloxane has a viscosity of from about 5 centipoise to about 80 centipoise and wherein x is from about 5 to about 80; and
   a reactive diluent selected from the group consisting of: α-olefins and vinyl ethers.

2. The release modifier according to claim 1, wherein z is 0.10 to 0.20.

3. The release modifier of claim 1, wherein $R^5$ is an alkyl or alkenyl of 1 to 40 carbon atoms.

4. The release modifier of claim 1, wherein $R^5$ is hydrogen.

5. The release modifier according to claim 1, wherein the organofunctional siloxane is a blend of at least one organofunctional siloxane, wherein $R^5$ is alkyl or alkenyl of 1 to 40 carbon atoms and at least one organofunctional siloxane, wherein $R^5$ is hydrogen.

6. The release modifier according to claim 1, wherein the organo functional siloxane has a viscosity of from about 5 centipoises to about 50 centipoises.

7. The release modifier according to claim 1, wherein the reactive diluent is an α-olefin selected from the group consisting of 1-octadecene, 1-dodecene, 1-tetradecene, 1-hexadecene, and vinyl cyclohexane.

8. The release modifier according to claim 1, wherein the reactive diluent is vinyl ether selected from the group consisting of dodecyl vinyl ether, ethyl hexyl vinyl ether, cyclohexyl vinyl ether, butanediol mono and divinyl ether, and diethylene glycol vinyl ether.

9. A release composition comprising the release modifier of claim 1 and a polyorganosiloxane polymer.

10. The release composition of claim 9, wherein the polyorganosiloxane polymer is represented by:

$$M^{vi}{}_a T_b D_c M_d$$

where $M^{vi}=R_{3-p}R^1{}_p SiO_{1/2}$, where R is selected from the group consisting of one to forty carbon monovalent hydrocarbon radicals, $R^1$ is selected from the group consisting of two to forty carbon atom olefinic monovalent hydrocarbon radicals, p ranges from 1 to 3; $T=R^2 SiO_{3/2}$, where $R^2$ is selected from the group consisting of R and $R^1$; $D=R^3 R^4 SiO_{2/2}$, where $R^3$ and $R^4$ are each independently selected from the group consisting of R and $R^1$; and $M=R_3 SiO_{1/2}$, where each R is independently selected, and the subscript a has a value ranging from about 2 to about 5, the subscript b has a value ranging from 0 to 5, c is an integer ranging from about 50 to about 1,000 and d has a value ranging from 0 to 0.5.

11. The release composition of claim 9, wherein the polyorganosiloxane polymer comprises from about 10 weight percent to about 90 weight percent of the release composition.

12. The release composition of claim 9, further comprising one or more optional components chosen from one or more reactive diluents, one or more siloxane cross-linking agents, one or more inhibitors, or one or more hydrosilation catalysts.

13. The release composition of claim 12, wherein the siloxane cross-linking agent comprises SiH-containing polyorganosiloxanes.

14. The release composition according to claim 12, wherein the siloxane cross-linking agent comprises a substantially linear hydrogen siloxane selected from the group of consisting of:

$$MD_e D'_f M$$

$$MD'_f M$$

$$MD_e D'_f M'$$

$$M'D_e D'_f M', \text{ and}$$

$$MD_e M'$$

where M is $R_3 SiO_{1/2}$,

M' is $H_g R_{3-g} SiO_{1/2}$,

D is $RRSiO_{2/2}$ where each R is independently selected, and

D' is $RHSiO_{2/2}$, where R is as previously defined, the subscripts e and f may be zero or positive wherein the sum of e and f ranges from about 10 to about 100 subject to the limitation that the sum of f and g is two or greater.

15. The release composition according to claim 12, wherein the inhibitor is selected from the group consisting of: ethylenically unsaturated amides, aromatically unsaturated amides, acetylenic compounds, ethylenically unsaturated isocyanates, olefinic siloxanes, unsaturated hydrocarbon diesters unsaturated hydrocarbon monoesters of unsaturated acids, conjugated ene-ynes, hydroperoxides, ketones, sulfoxides, amines, phosphines, phosphites, nitrites, and diaziridines.

16. The release composition of claim 12, wherein the hydrosilation catalyst is metal selected from the group consisting of: nickel, palladium, platinum, rhodium, iridium, ruthenium and osmium.

17. A multi-layered product comprising: (a) a release sheet comprising (i) a carrier and a release film and (ii) an adhesive sheet comprising a carrier and an adhesive film, wherein said release film is formed of the composition of claim 9, and wherein said release film is in contact with the adhesive film.

18. A substrate, comprising the composition according to claim 9, disposed on a surface of the substrate and cured.

* * * * *